UNITED STATES PATENT OFFICE.

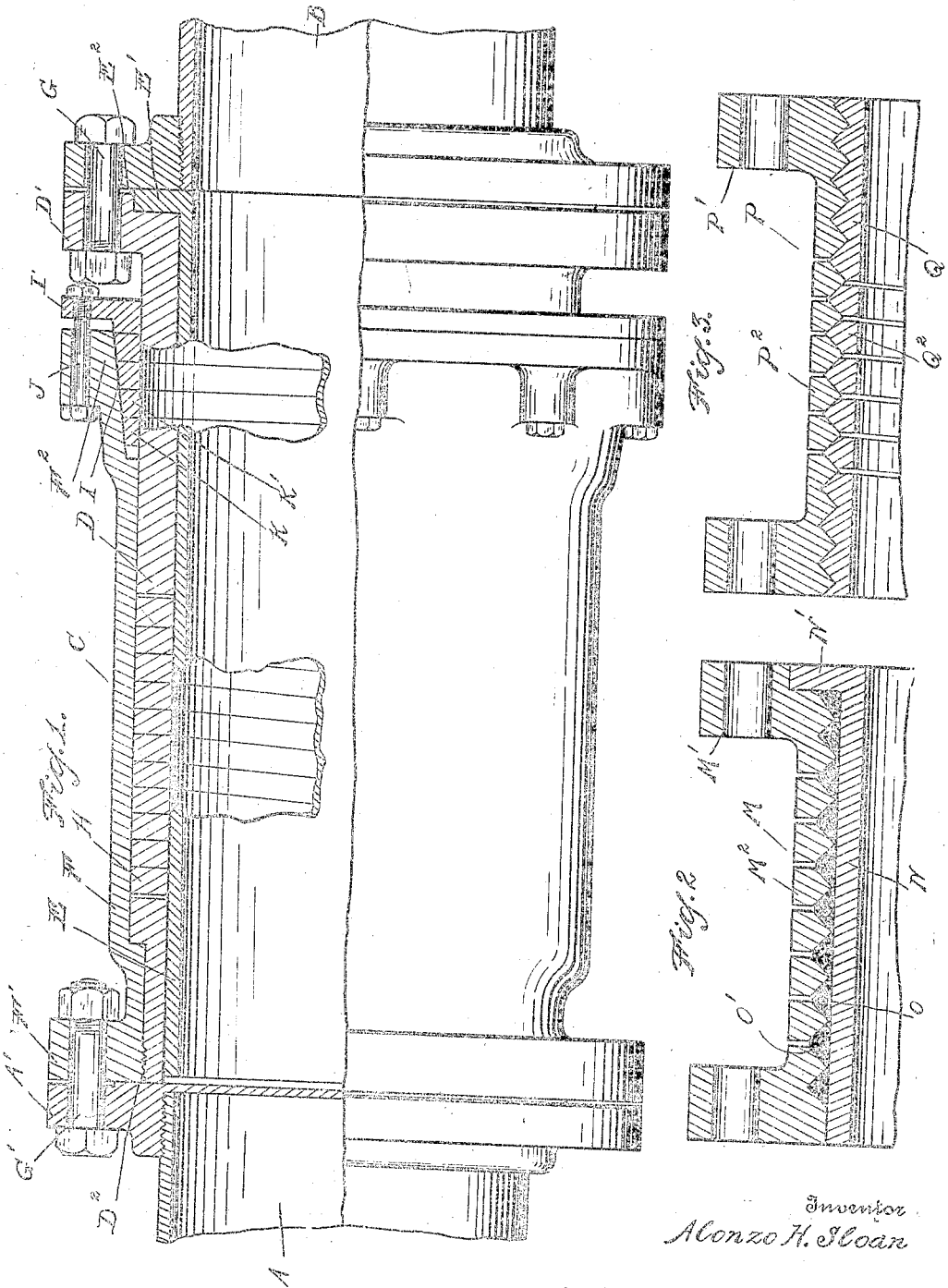

ALONZO H. SLOAN, OF DETROIT, MICHIGAN, ASSIGNOR, BY DIRECT AND MESNE ASSIGNMENTS, OF ONE-THIRD TO FRED ROSENFIELD, AND ONE-THIRD TO RAYMOND C. STRIKER, BOTH OF DETROIT, MICHIGAN.

EXPANSION-JOINT.

1,306,236.  Specification of Letters Patent.  Patented June 10, 1919.

Application filed February 11, 1918. Serial No. 216,468.

*To all whom it may concern:*

Be it known that I, ALONZO H. SLOAN, a citizen of the United States of America, residing at Detroit, in the county of Wayne and State of Michigan, have invented certain new and useful Improvements in Expansion-Joints, of which the following is a specification, reference being had therein to the accompanying drawings.

My invention relates to expansion joints and comprises the peculiar construction of expansion member intermediate the conduits through which fluid of high temperature, such as steam, passes and are caused to expand thereby. Another feature of my invention comprises the means for packing the joint. Other features of my invention reside in the peculiar arrangements and combination of parts as more fully hereinafter described.

In the drawings:

Figure 1 is a longitudinal sectional elevation of the expansion joint embodying my invention;

Figs. 2 and 3 are fragmentary longitudinal sectional views of modifications thereof.

A and B represent conduits through which passes fluids of high temperature, such as steam, which causes said conduits to expand longitudinally. C is the expansion joint intermediate these conduits and comprising the expansion member D and the concentric inner and outer guides E and F respectively.

The expansion member D has the flange D' at one end thereof adapted to be secured by the bolts G to the end of the conduit B. The opposite end of the expansion member D is adapted to be secured to the conduit A and, as shown, in Fig. 1, threadedly engages the outer guide F at D², which guide has the flanges F' adapted to be secured by the bolts G' to the flanges A' on the end of the conduit A. This joint between the expansion member D and the conduit A is steam tight.

In order to provide for the longitudinal expansion of the conduits A and B, the expansion member D has a portion H intermediate its ends cut to form a coil which is resilient and adapted to contract and expand longitudinally thereof. The inner guide or sleeve E has the flanged end E' fitting with the bore E² of the flange D' and extending slightly outward beyond the face of the flange, the joint between the expansion member D and the conduit B being steam tight.

As thus far described steam, or other fluids of high temperature, in passing through the conduits A and B expands the same longitudinally, which expansion is provided for by the resilient coil portion H contracting, the same being guided by the sleeves E and F. As the steam pressure within the expansion joint builds up, some may escape between the inner guide or sleeve E and the expansion member D at the end near the conduit A. This steam will pass through the coil passage formed by the coil portion H and between the outer guide or sleeve F and the expansion member D toward the free end F² of the former. The coil portion H is contracted due to the longitudinal expansion of the conduits A and B so that the coil passage is restricted. This passage being restricted and of a considerable length greatly reduces the pressure of the steam therein.

To prevent the escape of the steam at this end, the metallic packing I is provided comprising the tapering separate coils or split rings K, K', etc., fitting within the tapered seat between the expansion member D and the free end F². As shown, the outer peripheries of the coils or rings are tapered. For holding these coils or rings K, K', etc., tightly against their seats the flange I' is provided, spaced from the free end F² and adjustably secured thereto by the bolts J. The coils or rings tend to maintain their seats when slight wear of the contacting surfaces occurs; and when greater wear occurs can be seated tightly by adjusting the flange I' inward through the bolts J.

From the above description it will be readily seen that a simple construction of an expansion joint is provided, which is all metallic and furthermore that a simple effective construction of packing is provided.

As shown in the modification in Fig. 2, the expansion joint comprises the expansion member M having the flanged ends M' for attachment to the steam conduits and the intermediate coil portion M², and the concentric inner guide or sleeve N with the end flange N' fitting in a counterbore in one of the flanged ends. Packing O is provided fitting in the coiled V-shaped recesses O' having their apices in the cuts forming the coils of the coil portion M². This packing and the V-shaped coiled recesses are preferably continued to the end flange N' to permit of the insertion of the packing.

As shown in Fig. 3, the expansion joint comprises the expansion member P having the flanged ends P' for attachment to the steam conduits and the inner sleeve member Q, having respectively the coil portions P² and Q' in which the convolutions of the two coils alternate. This construction permits of the longitudinal expansion of the conduits and at the same time prevents the escape of the steam due to the fact that the outer periphery of the convolutions of the coil portions Q² of the inner sleeve are V-shaped and are engaged by coöperating seats upon adjacent convolutions of the coil portion P² of the expansion member.

What I claim as my invention is:

1. In an expansion joint between two conduits, an expansion member connected to said conduits and having a resilient coil portion for providing for the longitudinal expansion of said conduits.

2. In an expansion joint between two conduits, an expansion member connected to said conduits and having a resilient coil portion and means for guiding said resilient coil portion.

3. In an expansion joint between two conduits, an expansion member having its opposite ends connected to said conduits and a resilient coil portion and a concentric sleeve for guiding said expansion member.

4. The combination with two conduits, of an expansion joint, comprising an expansion member connected at one end directly to one of said conduits and a concentric sleeve for guiding said expansion member connected directly at one end to the other of said conduits, said expansion member threadedly engaging said sleeve and having a resilient coil portion.

5. The combination with two conduits, of an expansion joint comprising a sleeve member having a flanged end connected to one of said conduits, an expansion member having one end threadedly engaged within said sleeve member and the opposite end flanged and connected to the other of said conduits and an intermediate resilient coil portion, an inner sleeve member provided with a flanged end seated within said flanged end of said expansion member and a packing between said first mentioned sleeve member and said expansion member at the free end of the former.

6. In an expansion joint, the combination with an expansion member of an inner guide having a steam tight seal therewith at one end, an outer guide having a steam tight seal therewith at the opposite end, and packing between the opposite end of said outer guide and expansion member, said expansion member having a resilient coil portion providing a tortuous passage for the escaping steam to the packing.

7. In an expansion joint, the combination with a member, of a sleeve member, and a metallic packing between said members having a resilient coil or ring.

8. In an expansion joint, the combination with a member, of a sleeve member, and a packing between said members, comprising a series of coils having tapered peripheries.

9. The combination with two conduits of an expansion joint, comprising an expansion member connected at one end directly to one of said conduits and a concentric sleeve for guiding said expansion member connected directly at one end to the other of said conduits, said expansion member secured to said sleeve near one end of the former.

In testimony whereof I affix my signature.

ALONZO H. SLOAN.